US008180961B1

(12) United States Patent
Jiang et al.

(10) Patent No.: US 8,180,961 B1
(45) Date of Patent: May 15, 2012

(54) METHOD AND SYSTEM FOR REVOKING RIGHTS ASSOCIATED WITH I/O OPERATIONS IN STORAGE SYSTEMS

(75) Inventors: Tianyu Jiang, Mars, PA (US); Omprakaash C. Thoppai, Seven Fields, PA (US)

(73) Assignee: Netapp, Inc., Sunnyvale, CA (US)

( * ) Notice: Subject to any disclaimer, the term of this patent is extended or adjusted under 35 U.S.C. 154(b) by 487 days.

(21) Appl. No.: 12/431,615

(22) Filed: Apr. 28, 2009

(51) Int. Cl.
*G06F 12/00* (2006.01)
*G06F 12/14* (2006.01)
(52) U.S. Cl. ......... 711/114; 711/113; 711/156; 711/163
(58) Field of Classification Search .................. 711/114, 711/113, 156, 163
See application file for complete search history.

(56) References Cited

U.S. PATENT DOCUMENTS 7,437,407 B2 * 10/2008 Vahalia et al. ................ 709/203
2004/0133652 A1 * 7/2004 Miloushev et al. ........... 709/214

* cited by examiner

*Primary Examiner* — Alexander Sofocleous
*Assistant Examiner* — Hai Pham
(74) *Attorney, Agent, or Firm* — Klein, O'Neill & Singh, LLP (57) ABSTRACT

A machine implemented process and system is provided. The process determines if any right granted to an entity for performing an I/O operation associated with a data container stored at a first storage volume is to be revoked. The right itself may be cached at the first storage volume and resident at a second storage volume. A recall message is sent to the node that manages the second storage volume. Any pending I/O operation is completed, after the message is sent and before the right is revoked. Thereafter, the right is revoked and the cached copies of the right are invalidated.

32 Claims, 9 Drawing Sheets

| Member Vol. ID 502 | Inode Number 504 | Unique Identifier 506 | Striped Flag 508 | OpLock 510 | Others 512 |

METHOD AND SYSTEM FOR REVOKING RIGHTS ASSOCIATED WITH I/O OPERATIONS IN STORAGE SYSTEMS

1. TECHNICAL FIELD

The present disclosure relates to storage systems.

2. RELATED ART

A storage system typically comprises one or more storage devices where information may be stored and from where information may be retrieved, as desired. The storage system may be implemented in accordance with a variety of storage architectures including, but not limited to, a network-attached storage (NAS) environment, a storage area network (SAN) and a disk assembly directly attached to a client or host computer.

The storage system typically includes a storage operating system that may implement a high-level module, such as a file system, to logically organize information stored at storage volumes as a hierarchical structure of data containers, such as files and logical units. For example, stored files may be implemented as set of data structures, i.e., disk blocks, configured to store information, such as the actual data for the file. These data blocks are organized within a volume block number (vbn) space that is maintained by the file system. The file system typically organizes the data blocks within the vbn space as a "logical volume"; each logical volume may be, although is not necessarily, associated with its own file system.

The storage system may be configured to operate according to a client server model of information delivery to thereby allow many clients to access data containers stored on the system. In this model, the client may comprise an application, such as a database application, executing in a computer that communicates with the storage system. Each client may send input/output ("I/O") requests to read and write data containers.

A plurality of storage systems may be interconnected to service numerous client requests. A striped volume set ("SVS") may be used for servicing numerous clients. In a SVS, a data container, for example, a file, may be striped across a plurality of volumes. Stripes of data content of the data container are allocated to each volume of the SVS in a manner that balances data across the volumes. Each stripe has a defined size/width as specified by a set of striping rules associated with the SVS.

In the SVS environment, managing rights associated with I/O operations is a challenge. One example of such a right is an opportunistic lock ("OpLock") as used in the Common Internet File System ("CIFS") protocol. An OpLock lock is typically placed by one or more client application (may also be referred to as "a client") on a data container residing at a storage volume. The OpLock provides certain rights to the client to perform read and write operations with respect to the data container.

Because multiple clients execute different operations with respect to the same data containers, granting and revoking exclusionary rights (for example, OpLocks) can be challenging in the SVS environment. Continuous efforts are being made to better manage rights for conducting I/O operations and managing OpLocks.

SUMMARY

In one embodiment, a machine implemented process for managing rights granted to clients for performing I/O operations with respect to a stripped volume set ("SVS") is provided. The process determines if any right granted to a client (for example, an OpLock granted to a client application executed by a computing device) with respect to an I/O operation associated with a data container stored at a first storage volume is to be revoked. The OpLock may be resident at a second storage volume and cached at the first storage volume. The OpLock may have to be revoked because the data container has to be migrated from the first storage volume to another storage volume, the storage system may need to perform a failover operation or for any other reason.

After the process determines that the OpLock should be revoked, the process ascertains whether the second storage volume that "owns" the OpLock is local to a first node or remote to the first node. The first node in this context manages the first storage volume. If the second storage volume is local to the first node then the first node simply processes the message locally. If the second storage volume is remote, then the first node sends a message to a second node that manages the second storage volume to revoke the OpLock.

Thereafter, the recall message is sent to the node that interfaces with the client that was granted the OpLock. The node then sends the recall message to the client and any pending I/O operation is completed by the client. Thereafter, the OpLock is revoked and all cached copies of the right are invalidated by the node that manages the second storage volume.

In another embodiment, a machine implemented method for managing a right granted to a client associated with an input/output (I/O) operation on a data container stored in a SVS is provided. The method includes determining if the right granted to the client is to be revoked. The right is cached at a first storage volume and resident at a second storage volume.

If the second storage volume is managed by a second node operationally coupled to a first node that manages the first storage volume, then a recall message is sent from the first node to the second node for revoking the right granted to the client.

The method further includes, sending the recall message to the client for revoking the right; completing any pending I/O operation after the recall message is sent to the client; revoking the right granted to the client; and invalidating a cached copy of the right at the first storage volume.

In yet another embodiment a machine readable storage medium storing executable instructions, which when executed by a machine, causes the machine to perform a process for managing a right granted to a client associated with an input/output (I/O) operation on a data container stored in a SVS is provided. The process includes determining if the right granted to the client is to be revoked. The right is cached at a first storage volume and resident at a second storage volume.

If the second storage volume is managed by a second node operationally coupled to a first node that manages the first storage volume, then a recall message is sent from the first node to the second node for revoking the right granted to the client.

The process further includes, sending the recall message to the client for revoking the right; completing any pending I/O operation after the recall message is sent to the client; revoking the right granted to the client; and invalidating a cached copy of the right at the first storage volume.

In yet another embodiment, a computer program product is provided. The product includes a computer usable storage medium having computer readable instructions embodied therein for managing a right granted to a client associated with an input/output (I/O) operation on a data container stored in a SVS.

The instructions are for determining if the right granted to the client is to be revoked. The right is cached at a first storage volume and resident at a second storage volume.

If the second storage volume is managed by a second node operationally coupled to a first node that manages the first storage volume, then the product includes instructions for sending a recall message from the first node to the second node for revoking the right granted to the client.

The product further includes instructions for sending the recall message to the client for revoking the right; completing any pending I/O operation after the recall message is sent to the client; revoking the right granted to the client; and invalidating a cached copy of the right at the first storage volume.

In yet another embodiment, a machine implemented method for revoking a right granted to a client associated with an input/output (I/O) operation on a data container stored in a striped volume set (SVS) is provided. The method includes receiving a recall message at a second node from a first node for revoking the right cached at a first storage volume and resident at a second storage volume. The first node manages the first storage volume storing striped data and the second node manages the second storage volume.

The method further includes forwarding the recall message to the client that completes any pending I/O operation after receiving the recall message; and revoking the right granted to the client and invalidating the cached copy of the right at the first storage volume.

This brief summary has been provided so that the nature of this disclosure may be understood quickly. A more complete understanding of the disclosure can be obtained by reference to the following detailed description of the various embodiments thereof in connection with the attached drawings.

BRIEF DESCRIPTION OF THE DRAWINGS

The foregoing features and other features will now be described with reference to the drawings of the various embodiments. In the drawings, the same components have the same reference numerals. The illustrated embodiments are intended to illustrate, but not to limit the present disclosure. The drawings include the following Figures.

DETAILED DESCRIPTION

Definitions

The following definitions are provided as they are typically (but not exclusively) used in the computing/storage environment, implementing the various adaptive embodiments described herein.

"Data Container" means a file, a logical unit or any other information. The term file is used interchangeably with data container, throughout this specification.

"I/O operation" means an input/output operation for reading a data container or writing a data container in response to an I/O request.

"Opportunistic Lock" (may also be referred to as "OpLock") means a lock that is placed by one or more client application (may also be referred to as "a client") on a data container residing at a storage volume. The OpLock information may be embedded in a data container attribute (for example, the meta-data) for the data container. OpLock, based on client requests, coordinates data caching and coherency between clients and storage systems. Coherent data in this context means data that is the same across a network i.e. data stored by the storage system and locally by the clients is synchronized. OpLocks are defined by the Common Internet File System ("CIFS") protocol. There are different types of OpLocks, for example, Level 1, Level 2 and other types of OpLocks and the rights associated with an OpLock depends on the OpLock type.

"Level 1 OpLock" on a data container allows a client to "read-ahead" and cache both read-ahead and write data from the data container locally. The client may request a Level 1 OpLock after opening a data container, for example, a file. If no other client has the data container open, the storage system may grant the OpLock. If another client has opened the file, then the storage system refuses the OpLock request and the client does not use local caching of read and write data. When the storage system opens a data container that already has a Level 1 OpLock on it, the system examines the sharing state of the OpLock before it breaks the Level 1 OpLock.

"Level 2 OpLock": A Level 2 OpLock notifies a client that there are multiple concurrent clients of a data container and that none of the clients have modified the data container. This lock allows the client to perform read operations and obtain data container attributes using cached or read-ahead local information, but the client sends all other requests (such as for write operations) to the storage system. The Level 2 OpLock is typically used when one expects other applications to write to a data container at random or read the data container at random or sequentially.

"Revoking OpLock" (or "Recalling OpLock") means a process of degrading an OpLock that a client application has on a data container so that another client application can open the file, with or without an OpLock. When another client requests an "Open" operation to access a data container, the storage system delays the open operation and notifies the client holding the OpLock. The client holding the lock then takes appropriate actions based on the type of lock, for example abandoning read buffers, closing the file and others. The storage system opens the file for the client requesting the open operation after the client holding the OpLock notifies the storage system that it is done. However, when a Level 2 OpLock is revoked, the storage system reports to the client but does not wait for any acknowledgment because there is no cached data to be flushed. In acknowledging a break of any exclusive lock (for example, Level 1), the holder of a broken lock typically can request another OpLock through subsequent "Open" request.

"Rights" means a privilege that is granted to an entity, for example, a client application executed at a computing device, with respect to any I/O operations, for example, read and write operations. One example of such rights includes OpLocks that are described above.

"SVS" means a striped volume set where a data container, for example, a file, may be striped across a plurality of volumes. Stripes of data content of the data container are allocated to each volume of the SVS in a manner that balances data across the volumes. Each stripe has a defined size/width as specified by a set of striping rules associated with the SVS.

As used in this disclosure, the terms "component" "module", "system," and the like are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer executable components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

Process Flow:

In one embodiment, a machine implemented process for managing rights granted to clients for performing I/O operations with respect to a SVS is provided. The process determines if any right granted to a client (for example, an OpLock granted to a client application executed by a computing device) with respect to an I/O operation associated with a data container stored at a first storage volume is to be revoked. The OpLock may have to be revoked because the data container has to be migrated from the first storage volume to another storage volume, the storage system may need to perform a failover operation or for any other reason.

The OpLock may be resident at a second storage volume and cached at the first storage volume. In this context, the term resident means that the OpLock is managed and "owned" at the second storage volume but also cached at the first storage volume.

After the process determines that the OpLock should be revoked, the process ascertains whether the second storage volume that "owns" the OpLock is local to a first node or remote to the first node. The first node in this context manages the first storage volume. If the second storage volume is local to the first node then the first node simply processes the message locally. If the second storage volume is remote, then the first node sends a recall message to a second node that manages the second storage volume to revoke the OpLock.

Thereafter, the recall message is sent to the node that interfaces with the client that was granted the OpLock. The node then sends the recall message to the client and any pending I/O operation is completed by the client. Thereafter, all cached copies of the OpLock are invalidated by the node that manages the second storage volume.

Figure 1A:
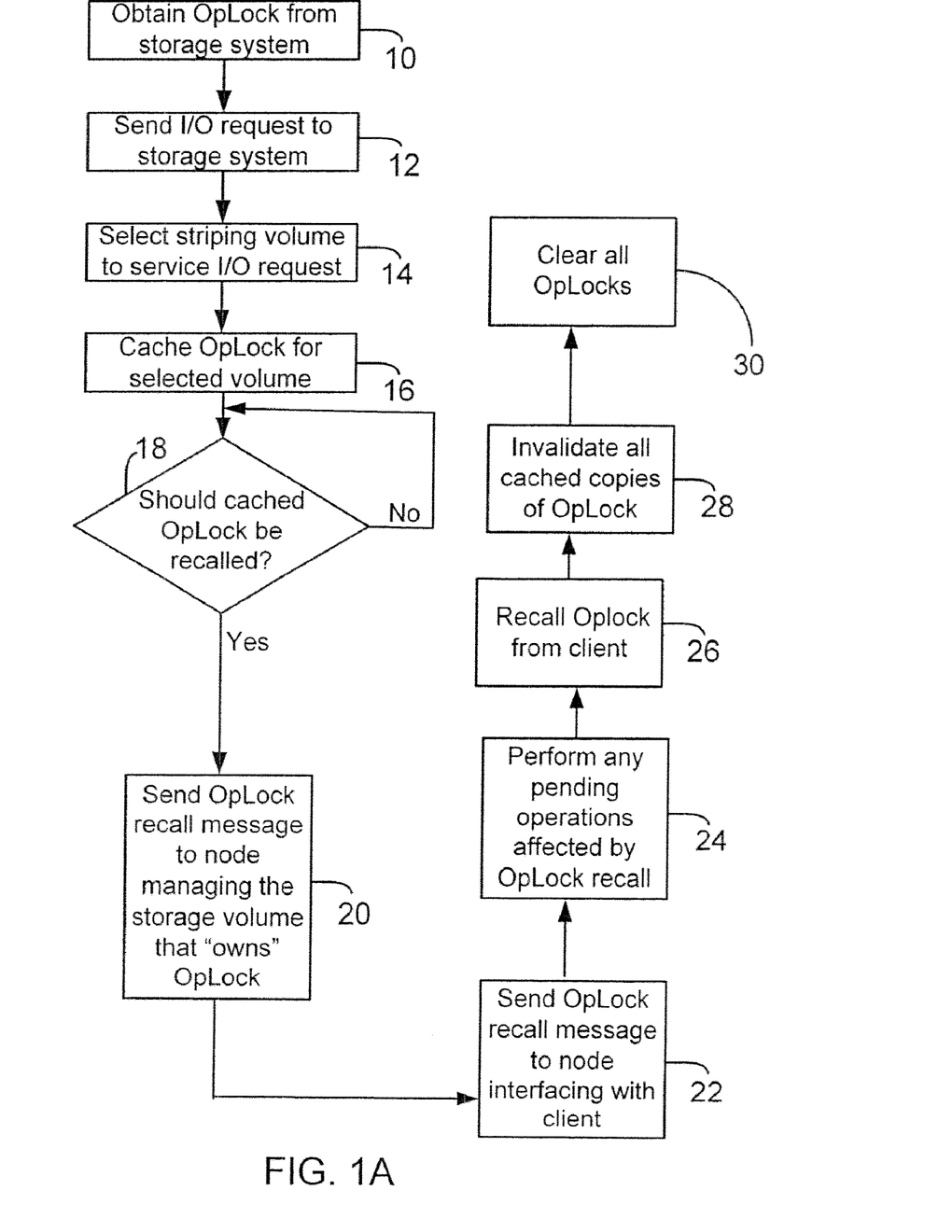
FIG. 1A shows a process flow diagram for recalling OpLocks, according to one embodiment of this disclosure.

The process flow according to one embodiment is now described with respect to FIG. 1A. In one embodiment, the process is described with respect OpLocks as used in a SVS environment; however, the process is applicable to any other right similar to OpLocks.

Figure 1B:
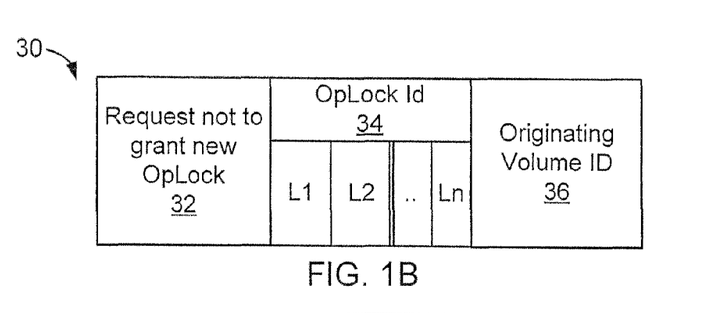
FIG. 1B shows an example of a OpLock Recall message, according to one embodiment of this disclosure.
Figure 1C:
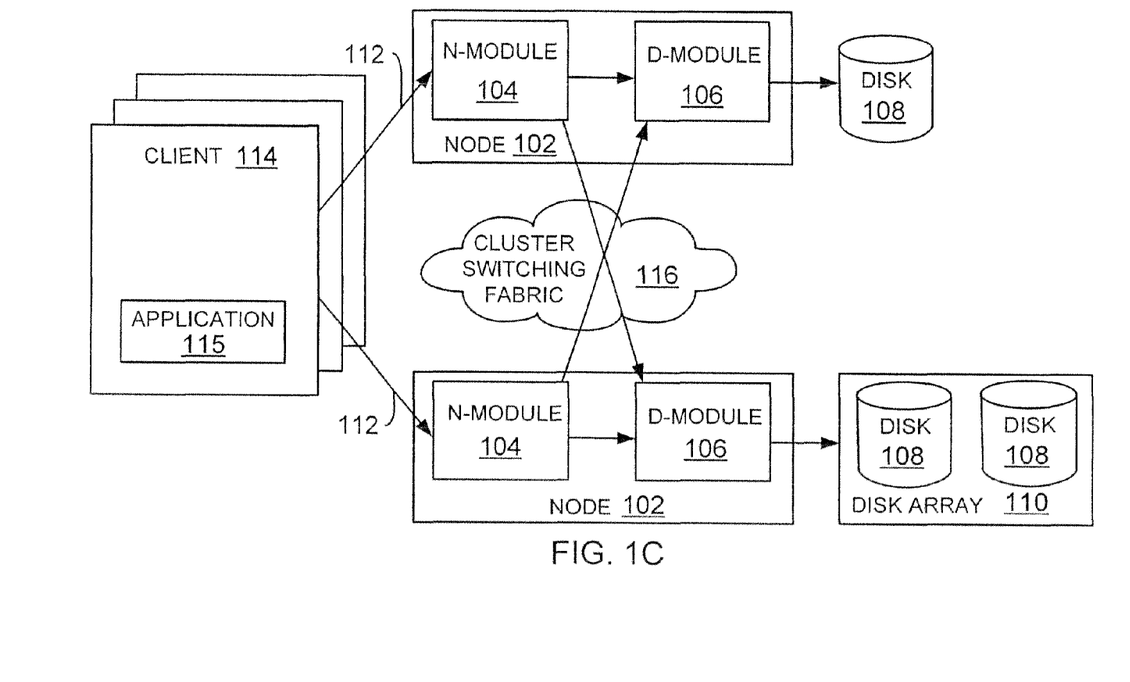
FIG. 1C shows a block diagram of a clustered system using the methodology of the present disclosure.

The process starts in block 10 when a client (for example, 114, See FIG. 1C) requests a right, for example, an OpLock from a storage system node (for example, N-Module 104 of 102, FIG. 1C). Node 102 then updates a data container attribute and grants the OpLock to the client. Thereafter, client 114 sends an I/O request with respect a data container, for example, a file, to node 102.

In block 14, the node (for example, D-Module 106 of node 102, FIG. 1C) selects a stripped volume to service the I/O request. The node may use a data container handle (for example, 500, FIG. 5) to select the stripped volume. Thereafter, in block 16, if the selected volume (also referred to as the first volume) does not own the OpLock, i.e., the OpLock is not resident at the first volume, then the node (for example, D-Module 106, FIG. 1C) acquires a copy of the OpLock from a second volume and operates with a cached copy of the OpLock.

The client 114 continues to process the I/O request and in block 18, the process determines if there is a need to recall the OpLock. One example of a situation where the OpLock may have to be recalled is if, the data container at the first storage volume is migrated to another storage volume. In that case, any pending OpLocks is recalled before the migration can actually take place. Another example, is when the storage system performs a failover operation, a maintenance operation or for any other reason.

If there is no need to recall the OpLock, the process simply loops back and continues to monitor in block 18 whether there is a need for recalling an OpLock.

If the OpLock needs to be recalled, then an OpLock recall message is sent to the node that manages the second storage volume. In one embodiment, the same node (for example, the same D-Module 106) may manage the first and second storage volumes. In such a case, the message is sent via a local process executed by the node.

In another embodiment, a different node (for example, a second node) manages the second storage volume. The second node is remote to the first node that manages the first storage volume. In such a case, a network connection, as described below, is used to send the recall message from the first node to the second node.

Thereafter, the OpLock recall message is sent to a node that interfaces with the client. In one embodiment, the node may be an N-Module 104 (FIG. 1C, described below). The N-Module 104 then sends the OpLock recall message to the client.

In block 24, the client completes any pending operations that may be affected by the recall. For example, a client application 115 (See FIG. 10) may send some information that may have to be written at the first storage volume where the lock is cached and/or at the second storage volume where the lock is resident. Thereafter, in block 26, the OpLock for the client is revoked.

In block 28, the cached OpLock at the first storage volume is invalidated by the node that manages the second storage volume. In one embodiment, a D-Module that manages the storage volume may maintain a table (not shown) with identifier information of all granted OpLocks and where they may be cached. The D-Module may simply set a flag or an indicator to invalidate the cached copy at the first storage volume. It is noteworthy that all cached copies of the OpLock at all storage volumes are invalidated, before the recall is completed.

In block 30, the OpLock is cleared from the second storage volume that "owns" the OpLock (i.e. where the OpLock was resident).

Figure 2:
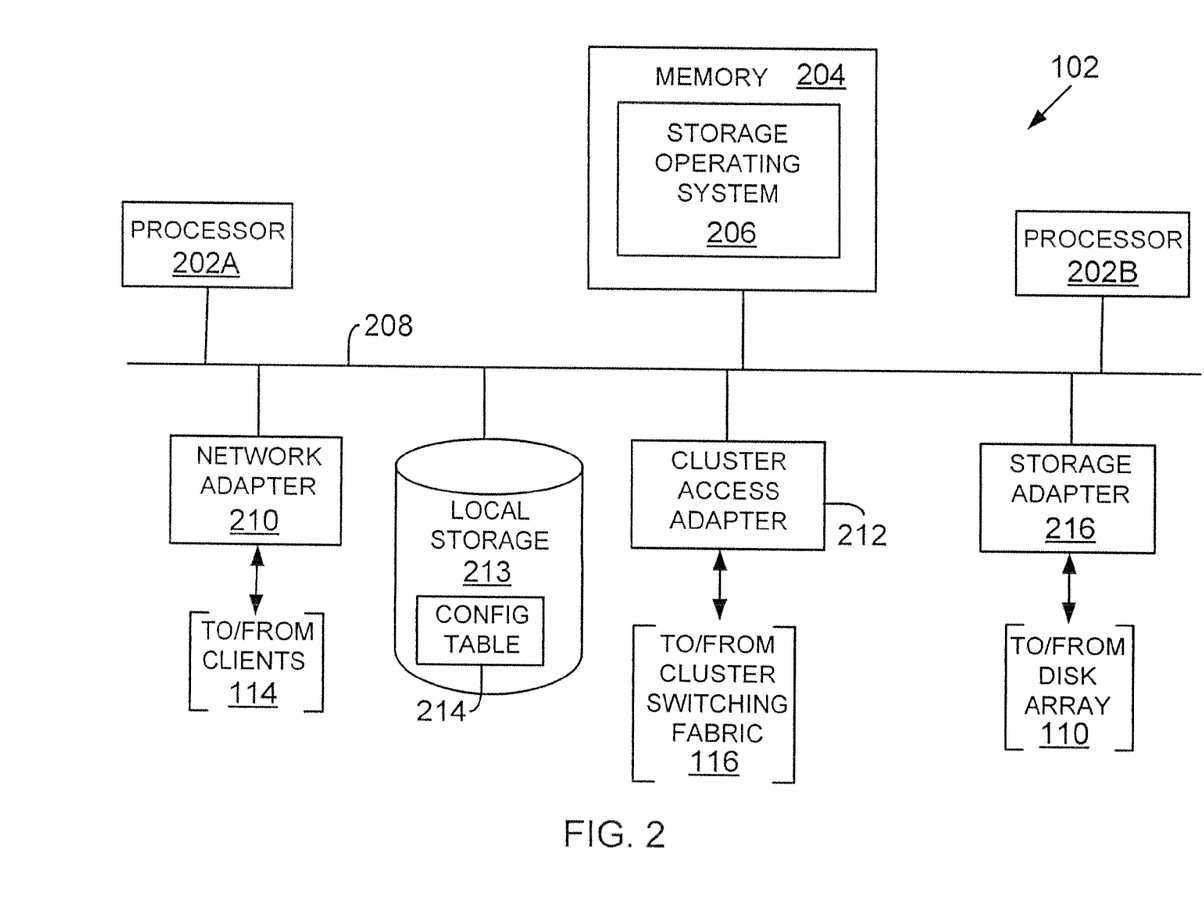
FIG. 2 shows an example of a node used by the system of FIG. 1C.

In one embodiment, executable blocks 14, 16, 18, 20, 22, 24, 28 and 30 are executed by a processor (for example, 202A, FIG. 2) executing programmable instructions, (for example, operating system (206, FIG. 2)) out of memory (for example, 204, FIG. 2).

Recall Message: FIG. 1B shows an example of an OpLock recall message 30 (also referred to as Message 30), used according to one embodiment of the present disclosure. Message 30 is sent by a node controlling the first storage volume that requests an OpLock recall, as described above with respect to block 20 of FIG. 1A.

Message 30 includes a request 32 to a node to not grant any more OpLocks with respect to the data containers stored at the first storage volume. Message 30 may also include the OpLock identifiers 34 that identify one or more OpLocks that need to be revoked.

Message 30 further includes an identifier 36 that identifies the originating volume (for example, the first storage volume) where the OpLock is cached. Identifier 36 assists the node managing the second storage volume in identifying the first storage volume where the OpLock is cached.

To facilitate an understanding of the various embodiments of the present disclosure, the general architecture and operation of a networked, clustered storage system will now be described.

Clustered System:

FIG. 1C is a schematic block diagram of a plurality of nodes 102 interconnected as a cluster 100 and configured to provide storage services related to organization of information on storage devices. Nodes 102 comprise various functional components that cooperate to provide distributed storage system architecture of cluster 100. Each node 102 is generally organized as a network element (N-module 104) and a disk element (D-module 106). N-module 104 includes functionality that enables node 102 to connect to clients 114 over a computer network 112, while each D-module 106 connects to one or more storage devices, such as disks 108 or a disk array 110.

Nodes 102 may be interconnected by a cluster switching fabric 116 which, in the illustrative embodiment, may be embodied as a Gigabit Ethernet switch. It should be noted that while there is shown an equal number of N and D-modules in the illustrative cluster 100, there may be differing numbers of N and/or D-modules in accordance with various embodiments of the present invention. For example, there may be a plurality of N-modules and/or D-modules interconnected in a cluster configuration 100 that does not reflect a one-to-one correspondence between the N and D-modules. As such, the description of a node 102 comprising one N-module and one D-module should be taken as illustrative only.

Clients 114 may be general purpose computers having a plurality of components. These components may include a central processing unit (CPU), main memory, I/O devices, and storage devices (for example, flash memory, hard drives and others). The main memory may be coupled to the CPU via a system bus or a local memory bus. The main memory may be used to provide the CPU access to data and/or program information that is stored in main memory at execution time. Typically, the main memory is composed of random access memory (RAM) circuits. A computer system with the CPU and main memory is often referred to as a host system.

Clients 114 may be configured to interact with the node 102 in accordance with a client/server model of information delivery. That is, each client 114 may request the services of the node 102, and the node 102 may return the results of the services requested by the client 114, by exchanging packets over the network 112. The client 114 may issue packets using application 115 including file-based access protocols, such as the CIFS protocol or Network File System ("NFS") protocol, over the Transmission Control Protocol/Internet Protocol ("TCP/IP") when accessing information in the form of certain data containers, such as files and directories. Alternatively, the client 114 may issue packets using application 115 including block-based access protocols, such as the Small Computer Systems Interface ("SCSI") protocol encapsulated over TCP ("iSCSI") and SCSI encapsulated over Fibre Channel ("FCP"), when accessing information in the form of other data containers, such as blocks.

Storage System Node:

FIG. 2 is a block diagram of a node 102 that is illustratively embodied as a storage system comprising plurality of processors 202A and 202B, a memory 204, a network adapter 210, a cluster access adapter 212, a storage adapter 216 and local storage 213 interconnected by a system bus 208. The local storage 213 comprises one or more storage devices, such as disks, utilized by the node to locally store configuration information (e.g., in a configuration table 214).

The cluster access adapter 212 comprises a plurality of ports adapted to couple node 102 to other nodes of cluster 100. In the illustrative embodiment, Ethernet may be used as the clustering protocol and interconnect media, although it will be apparent to those skilled in the art that other types of protocols and interconnects may be utilized within the cluster architecture described herein. In alternate embodiments where the N-modules and D-modules are implemented on separate storage systems or computers, the cluster access adapter 212 is utilized by the N/D-module for communicating with other N/D-modules in the cluster 100.

Each node 102 is illustratively embodied as a dual processor storage system executing a storage operating system 206 that preferably implements a high-level module, such as a file system, to logically organize the information as a hierarchical structure of named directories, files and special types of files called virtual disks (hereinafter generally "blocks") on disks 108. However, it will be apparent to those of ordinary skill in the art that the node 102 may alternatively comprise a single or more than two processor systems. Illustratively, one processor 202A executes the functions of the N-module 104 on the node, while the other processor 202B executes the functions of the D-module 106.

The memory 204 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the invention described herein.

The storage operating system 206, portions of which is typically resident in memory and executed by the processing elements, functionally organizes the node 102 by, alia, invoking storage operations in support of the storage service implemented by the node. An example of operating system 206 is the DATA ONTAP® (Registered trademark of NetApp, Inc.) operating system available from NetApp, Inc. that implements a Write Anywhere File Layout (WAFL® (Registered trademark of NetApp, Inc.)) file system. However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings of this invention.

The network adapter 210 comprises a plurality of ports adapted to couple the node 102 to one or more clients 114 over point-to-point links, wide area networks, virtual private networks implemented over a public network (Internet) or a shared local area network. The network adapter 210 thus may comprise the mechanical, electrical and signaling circuitry needed to connect the node to the network. Illustratively, the computer network 112 may be embodied as an Ethernet network or a Fibre Channel (FC) network. Each client 114 may communicate with the node over network 112 by exchanging discrete frames or packets of data according to pre-defined protocols, such as TCP/IP.

The storage adapter 216 cooperates with the storage operating system 206 executing on the node 102 to access information requested by the clients. The information may be stored on any type of attached array of writable storage device media such as video tape, optical, PVC, magnetic tape, bubble memory, electronic random access memory, micro-electro mechanical and any other similar media adapted to store information, including data and parity information. However, as illustratively described herein, the information is preferably stored on the disks 108 of array 110. The storage adapter 216 comprises a plurality of ports having input/output (I/O) interface circuitry that couples to the disks over an I/O interconnect arrangement, such as a conventional high-performance, FC link topology.

Storage of information on each array 110 is preferably implemented as one or more storage "volumes" that comprise a collection of physical storage disks 108 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

Figure 3A:
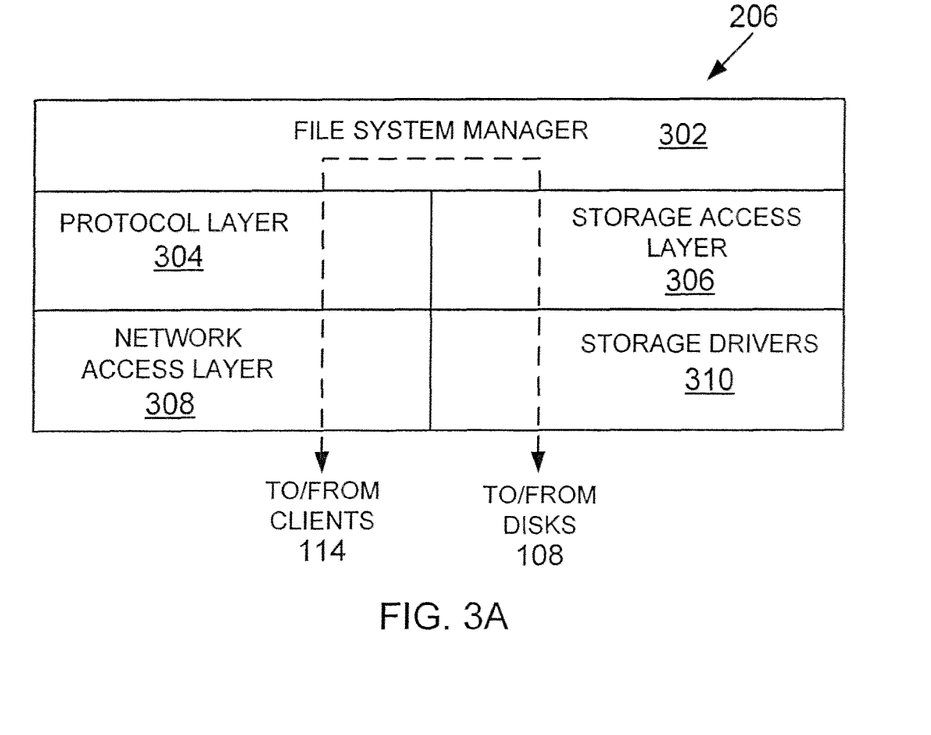
FIGS. 3A and 3B show examples of an operating system used according to one embodiment of the present disclosure.

Operating System:

FIG. 3A illustrates a generic example of operating system 206 executed by node 102, according to one embodiment of the present disclosure. In one example, operating system 206 may include several modules, or "layers" executed by one or both of N-Module 104 and D-Module 106. These layers include a file system manager 302 that keeps track of a directory structure (hierarchy) of the data stored in storage devices and manages read/write operations, i.e. executes read/write operations on disks in response to client 114 requests.

Operating system 206 may also include a protocol layer 304 and an associated network access layer 308, to allow node 102 to communicate over a network with other systems, such as clients 114. Protocol layer 304 may implement one or more of various higher-level network protocols, such as NFS, CIFS, Hypertext Transfer Protocol (HTTP), TCP/IP and others, as described below.

Network access layer 308 may include one or more drivers, which implement one or more lower-level protocols to communicate over the network, such as Ethernet. Interactions between clients 114 and mass storage devices 108 (e.g. disks, etc.) are illustrated schematically as a path, which illustrates the flow of data through operating system 206.

The operating system 206 may also include a storage access layer 306 and an associated storage driver layer 310 to allow D-module 106 to communicate with a storage device. The storage access layer 306 may implement a higher-level disk storage protocol, such as RAID (redundant array of inexpensive disks), while the storage driver layer 310 may implement a lower-level storage device access protocol, such as FC or SCSI. In one embodiment, the storage access layer 306 may implement the RAID protocol, such as RAID-4 or RAID-DPT™ (RAID double parity for data protection provided by NetApp Inc. the assignee of the present disclosure).

Figure 3B:
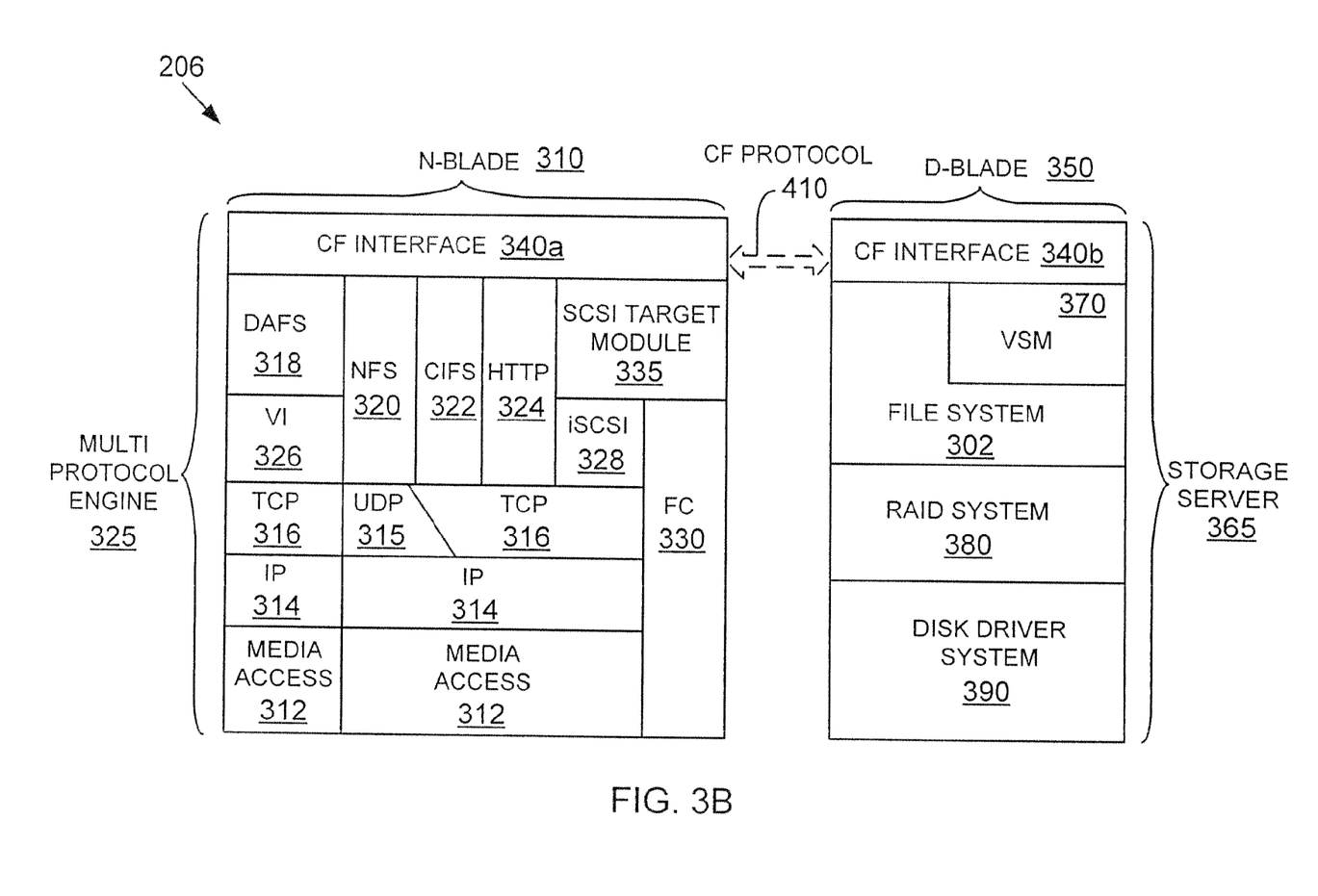

FIG. 3B shows a detailed block diagram of the storage operating system 206 that may be advantageously used with the present invention. The storage operating system comprises a series of processor executable layers organized to form an integrated network protocol stack or, more generally, a multi-protocol engine 325 that provides data paths for clients to access information stored on the node using block and file access protocols. The multi-protocol engine includes a media access layer 312 (part layer 308, FIG. 3A) of network drivers (e.g., Gigabit Ethernet drivers) that interfaces to network protocol layers (part of layer 304, FIG. 3A), such as the IP layer 314 and its supporting transport mechanisms, the TCP layer 316 and the User Datagram Protocol (UDP) layer 315.

A file system protocol layer provides multi-protocol file access and, to that end, includes support for the Direct Access File System (DAFS) protocol 318, the NFS protocol 320, the CIFS protocol 322 and the HTTP protocol 324.

A virtual interface ("VI") layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the node 102.

In addition, the storage operating system includes a series of processor executable layers organized to form a storage server 365 that provides data paths for accessing information stored on the disks 108 of the node 102. To that end, the storage server 365 includes a file system module 302 in cooperating relation with a volume stripped module (VSM) 370, a RAID system module 380 and a disk driver system module 390.

The VSM 370 illustratively implements a SVS. The VSM cooperates with the file system 302 to enable storage server 365 to service a volume of the SVS. In one embodiment, VSM

370 may also implement the SVS related process steps described above with respect to FIG. 1A.

The RAID system 380 manages the storage and retrieval of information to and from the volumes/disks in accordance with I/O operations, while the disk driver system 390 implements a disk access protocol such as, e.g., the SCSI protocol. The file system 302 implements a virtualization system of the storage operating system 206 through the interaction with one or more virtualization modules illustratively embodied as, e.g., a virtual disk (vdisk) module (not shown) and a SCSI target module 335. The SCSI target module 335 is generally disposed between the FC and iSCSI drivers 328, 330 and the file system 302 to provide a translation layer of the virtualization system between the block (lun) space and the file system space, where luns are represented as blocks.

The file system 302 is illustratively a message-based system that provides logical volume management capabilities for use in access to the information stored on the storage devices, such as disks. That is, in addition to providing file system semantics, the file system 302 provides functions normally associated with a volume manager. These functions include (i) aggregation of the disks, (ii) aggregation of storage bandwidth of the disks, and (iii) reliability guarantees, such as mirroring and/or parity (RAID).

The file system 302 illustratively may implement the write-anywhere file system having an on-disk format representation that is block-based using, e.g., 4 kilobyte (KB) blocks and using index nodes ("modes") to identify data containers and data container attributes (such as creation time, access permissions, size and block location and OpLock). The file system uses data containers to store meta-data describing the layout of its file system; these meta-data data containers include, among others, an mode data container. A data container handle, i.e., an identifier that includes an mode number (inum), may be used to retrieve an mode from disk.

Broadly stated, all modes of the write-anywhere file system are organized into the mode data container. A file system (fs) info block specifies the layout of information in the file system and includes an mode of a data container that includes all other modes of the file system. Each logical volume (file system) has an fsinfo block that is preferably stored at a fixed location within, e.g., a RAID group. The mode of the mode data container may directly reference (point to) data blocks of the mode data container or may reference indirect blocks of the mode data container that, in turn, reference data blocks of the mode data container. Within each data block of the mode data container are embedded inodes, each of which may reference indirect blocks that, in turn, reference data blocks of a data container.

Operationally, a request from the client 114 is forwarded as a packet over the computer network 112 and onto the node 102 where it is received at the network adapter 210. A network driver processes the packet and, if appropriate, passes it on to a network protocol and file access layer for additional processing prior to forwarding to the write-anywhere file system 302. Here, the file system generates operations to load (retrieve) the requested data from disk 108 if it is not resident "in core", i.e., in memory 204.

If the information is not in memory, the file system 302 indexes into the mode data container using the mode number (inum) to access an appropriate entry and retrieve a logical vbn. The file system then passes a message structure including the logical vbn to the RAID system 380; the logical vbn is mapped to a disk identifier and disk block number (disk, dbn) and sent to an appropriate driver (e.g., SCSI) of the disk driver system 390. The disk driver accesses the dbn from the specified disk 108 and loads the requested data block(s) in memory for processing by the node. Upon completion of the request, the node (and operating system) returns a reply to the client 114.

It should be noted that the software "path" through the operating system layers described above needed to perform data storage access for a client request received at node 102 may alternatively be implemented in hardware. That is, in an alternate embodiment of the disclosure, the storage access request data path may be implemented as logic circuitry embodied within a field programmable gate array (FPGA) or an ASIC. This type of hardware implementation increases the performance of the file service provided by node 102 in response to a file system request issued by client 114.

As used herein, the term "storage operating system" generally refers to the computer-executable code operable on a computer to perform a storage function that manages data access and may, in the case of a node 102, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this disclosure can be adapted to a variety of storage system architectures including, but not limited to, a network-attached storage environment, a storage area network and a disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

CF Protocol

In the illustrative embodiment, the storage server 365 is embodied as D-Module 106 to service one or more volumes of array 110. In addition, the multi-protocol engine 325 is embodied as N-Module 104 to (i) perform protocol termination with respect to a client issuing incoming data access request packets over the network 112, as well as (ii) redirect those data access requests to any storage server 365 of the cluster 100. Moreover, the N-Module 104 and D-Module 106 cooperate to provide a highly-scalable, distributed storage system architecture of the cluster 100. To that end, each module includes a cluster fabric (CF) interface module 340*a, b* adapted to implement intra-cluster communication among the modules, including D-Module-to-D-Module communication for data container striping operations described herein.

The protocol layers, e.g., the NFS/CIFS layers and the iSCSI/FC layers, of the N-Module 104 function as protocol servers that translate file-based and block based data access requests from clients into CF protocol messages used for communication with the D-Module 106. That is, the N-Module servers convert the incoming data access requests into file system primitive operations (commands) that are embedded within CF messages by the CF interface module 340 for transmission to the D-Modules 106 of the cluster 100. Notably, the CF interface modules 340 cooperate to provide a single file system image across all D-Modules 106 in the cluster 100. Thus, any network port of an N-Module that receives a client request can access any data container within the single file system image located on any D-Module 106 of the cluster.

Further to the illustrative embodiment, the N-Module 104 and D-Module 106 are implemented as separately-scheduled processes of storage operating system; however, in an alternate embodiment, the modules may be implemented as pieces of code within a single operating system process. Communication between an N-Module and D-Module is thus illustratively effected through the use of message passing between the modules although, in the case of remote communication between an N-Module and D-Module of different nodes, such message passing occurs over the cluster switching fabric 150. A known message-passing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from Network Appliance, Inc. The SpinFS protocol is described in U.S. Patent Application Publication No. US 2002/0116593.

The CF interface module 340 implements the CF protocol for communicating file system commands among the modules of cluster 100. Communication is illustratively effected by the D-Module exposing the CF API to which an N-Module (or another D-Module) issues calls. To that end, the CF interface module 340 is organized as a CF encoder and CF decoder. The CF encoder of, e.g., CF interface 340a on N-Module 104 encapsulates a CF message as (i) a local procedure call (LPC) when communicating a file system command to a D-Module 106 residing on the same node 102 or (ii) a remote procedure call (RPC) when communicating the command to a D-Module residing on a remote node of the cluster 100. In either case, the CF decoder of CF interface 340b on D-Module 106 de-encapsulates the CF message and processes the file system command.

Figure 4:
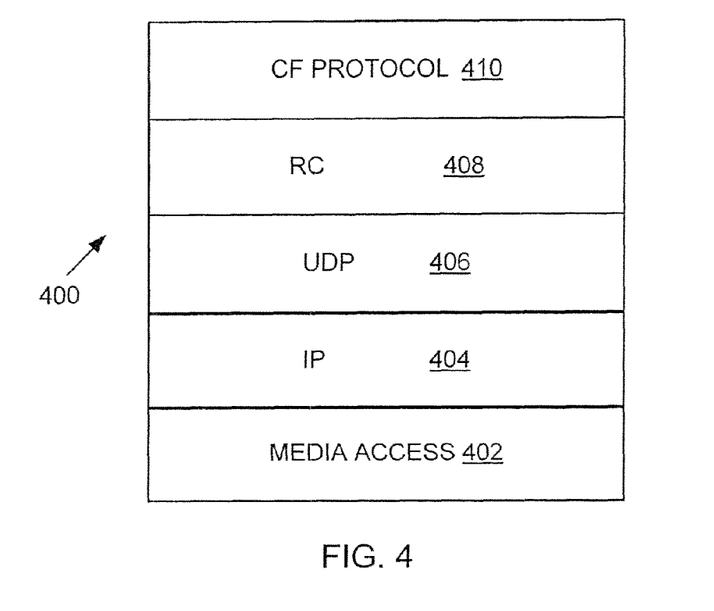
FIG. 4 shows an example of a message used according to one embodiment of the present disclosure.

FIG. 4 is a schematic block diagram illustrating the format of a CF message 400 in accordance with an embodiment of with the present invention. The CF message 400 is illustratively used for RPC communication over the switching fabric 150 between remote modules of the cluster 100; however, it should be understood that the term "CF message" may be used generally to refer to LPC and RPC communication between modules of the cluster. The CF message 400 includes a media access layer 402, an IP layer 404, a UDP layer 406, a reliable connection (RC) layer 408 and a CF protocol layer 410. As noted, the CF protocol is a generic file system protocol that conveys file system commands related to operations contained within client requests to access data containers stored on the cluster 100; the CF protocol layer 410 is that portion of message 400 that carries the file system commands. Illustratively, the CF protocol is datagram based and, as such, involves transmission of messages or "envelopes" in a reliable manner from a source (e.g., an N-Module 104) to a destination (e.g., a D-Module 106). The RC layer 408 implements a reliable transport protocol that is adapted to process such envelopes in accordance with a connectionless protocol, such as UDP 406.

Figure 5:
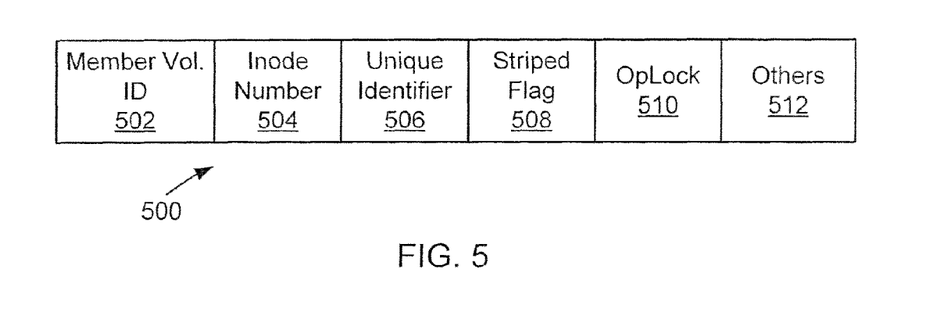
FIG. 5 shows an example of a data container handle, used according to one embodiment of the present disclosure.

Data Container Attribute Handle: FIG. 5 shows of a format of data container attribute handle 500 (may also be referred to as "Handle 500") that may be used to access a data container e.g. a file. Handle 500 may include various fields that describe the location and data container characteristics. For example, Handle 500 may include a Member Volume Identifier field 502, an inode number field 504, a unique identifier field 506, a striped flag field 508, OpLock information 510 and other fields 512.

The Member Volume ID field 502 identifies the SVS volume within which the data container resides. The inode number field 504 contains an inode number of an inode (within an inode file) pertaining to the data container. The unique identifier field 506 may used to identify the DCA block 500.

The OpLock information 510 may include an OpLock identifier that identifies an OpLock that may be granted to a client 114. It is noteworthy that OpLock information 510 may be derived from other sources, for example, information related to client 114 that identifies a lock owner. Field 512 may be a reserved field to store any other information.

File System Organization

Figure 6A:
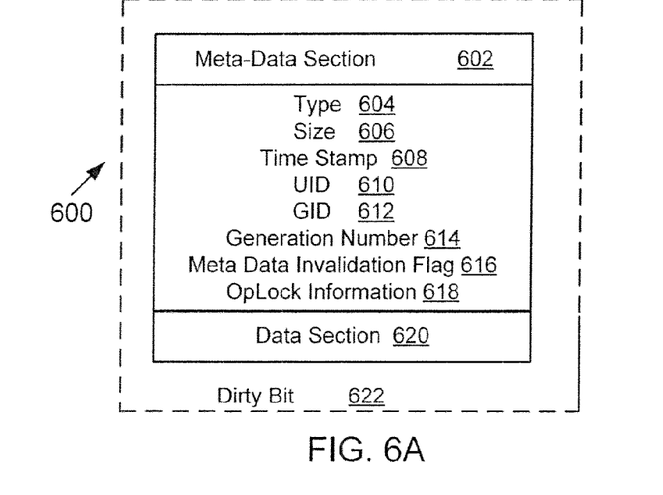
FIG. 6A shows an example of an mode used according to one embodiment.

In the illustrative embodiment, a data container is represented in the write-anywhere file system as an inode data structure adapted for storage on the disks 108. FIG. 6A is a schematic block diagram of an inode 600, which preferably includes a meta-data section 602 and a data section 620. OpLock information 618 may be stored within meta-data section 602. The use of this information is described below in detail.

The information stored in the meta-data section 602 of each inode 600 describes the data container (e.g., a file) and, as such, includes the type (e.g., regular, directory, vdisk) 606 of data container, its size 615, time stamps (e.g., access and/or modification time) 608 and ownership, i.e., user identifier (UID 610) and group ID (GID 612), of the data container. The meta-data section 602 also includes a generation number 614, and a meta-data invalidation flag field 616, the latter indicating meta-data whether meta-data in the inode is usable. The contents of the data section 620 of each inode may be interpreted differently depending upon the type of data container (inode) defined within the type field 606. For example, the data section 620 of a directory inode may include meta-data controlled by the file system, whereas the data section of a regular inode contains file system data. In this latter case, the data section 620 includes a representation of the data associated with the data container.

When an on-disk inode (or block) is loaded from disk 108 into memory 204, its corresponding in-core structure embeds the on-disk structure. For example, the dotted line surrounding the inode 600 indicates the in-core representation of the on-disk inode structure. The in-core structure is a block of memory that stores the on-disk structure plus additional information needed to manage data in the memory (but not on disk). The additional information may include, e.g., a "dirty" bit 622. After data in the inode (or block) is updated/modified as instructed by, e.g., a write operation, the modified data is marked "dirty" using the dirty bit 622 so that the inode (block) can be subsequently "flushed" (stored) to disk.

Figure 6B:
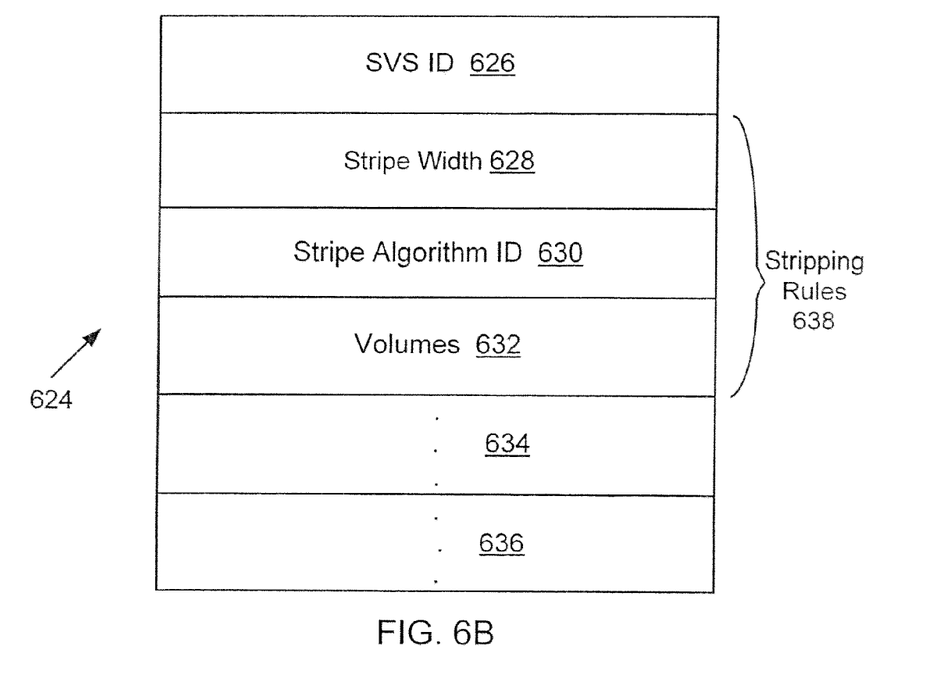
FIG. 6B shows an example of an SVS entry, used according to one embodiment.

FIG. 6B is a schematic block diagram of an SVS entry 624 used in accordance with an embodiment of the present invention. Entry 624 includes a SVS ID field 626 and one or more sets of striping rules 638. In alternate embodiments additional fields 636 may be included. The SVS ID field 626 includes an identifier (ID) of a SVS which, in operation, is specified in data container handle 500 (for example, as a member volume ID 503).

Each set of striping rules 638 illustratively includes a stripe width field 628, a stripe algorithm ID field 630, an ordered list of volumes field 632 and, in alternate embodiments, additional fields 634. The striping rules 638 contain information for identifying the organization of a SVS. For example, the stripe algorithm ID field 630 identifies a striping algorithm used with the SVS. In the illustrative embodiment, multiple striping algorithms could be used with a SVS; accordingly, stripe algorithm ID is needed to identify which particular algorithm is utilized. Each striping algorithm, in turn, specifies the manner in which file content is apportioned as stripes across the plurality of volumes of the SVS.

The stripe width field 628 specifies the size/width of each stripe. The ordered list of volumes field 632 contains the IDs of the volumes comprising the SVS. In an illustrative embodiment, the ordered list of volumes that may specify the function and implementation of the various volumes and striping rules of the SVS. For example, the ordering of volumes in the list may denote the manner of implementing a particular data placement pattern, e.g., round-robin.

To locate a D-Module 106 and its associated volume of a SVS in order to service a data access request to a file, a function uses the SVS ID 626, an offset within the file, the inode number for the file and a set of striping rules 638. For example, assume a data access request directed to a file is issued by a client 114 and received at the N-Module 104 of a node 102, where it is parsed through the multi-protocol engine 325 to the appropriate protocol server of N-Module 104.

To determine the location of a D-Module 106 to which to transmit a CF message 400, the N-Module 104 may first retrieve a SVS entry 626 to acquire the striping rules 638 (and list of volumes 632) associated with the SVS. The N-Module 104 then identifies the appropriate volume (and D-Module) to which to direct an operation. The protocol server of N-Module 104 then transmits the CF message 400 to the D-Module 106.

Figure 6C:
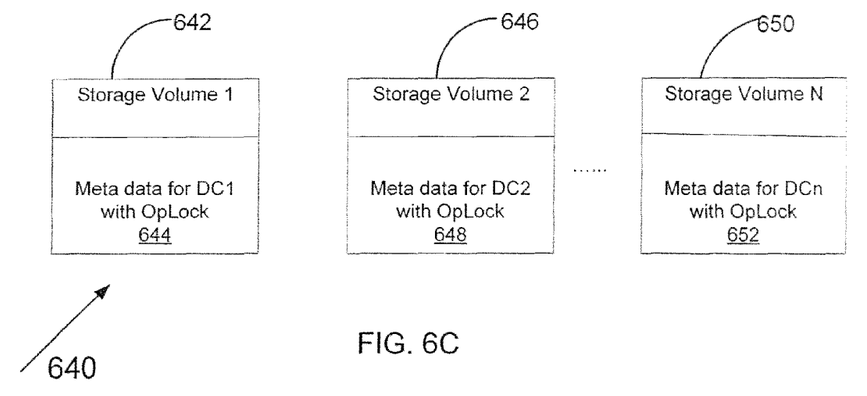
FIG. 6C shows an example of a distributed structure for storing OpLock information, according to one embodiment.

Distributed Environment for Storing Oplocks:

FIG. 6C shows a distributed structure 640 for storing OpLocks in a distributed environment, according to one embodiment. The term distributed environment, as used herein, means that OpLocks for different data containers may be stored at different storage volumes, unlike conventional systems, where all OpLocks are stored at a single storage volume.

Structure 640 shows a plurality of storage volumes 642, 646 and 650 managed by one or more nodes 102. The storage volumes store meta-data with OpLock information for a plurality of data containers. For example, storage volume 642 stores meta-data 644 for a data container 1 (shown as DC1) with OpLock information for DC1. Storage volume 646 stores meta-data 648 for data container DC2 with OpLock information. Storage volume 650 stores meta-data 652 for DCn with OpLock information.

In one embodiment, structure 640 is different from conventional systems where OpLock information for data containers is stored at a single volume. The distributed structure is advantageous because it reduces bottlenecks for granting and maintaining OpLocks.

Figure 7:
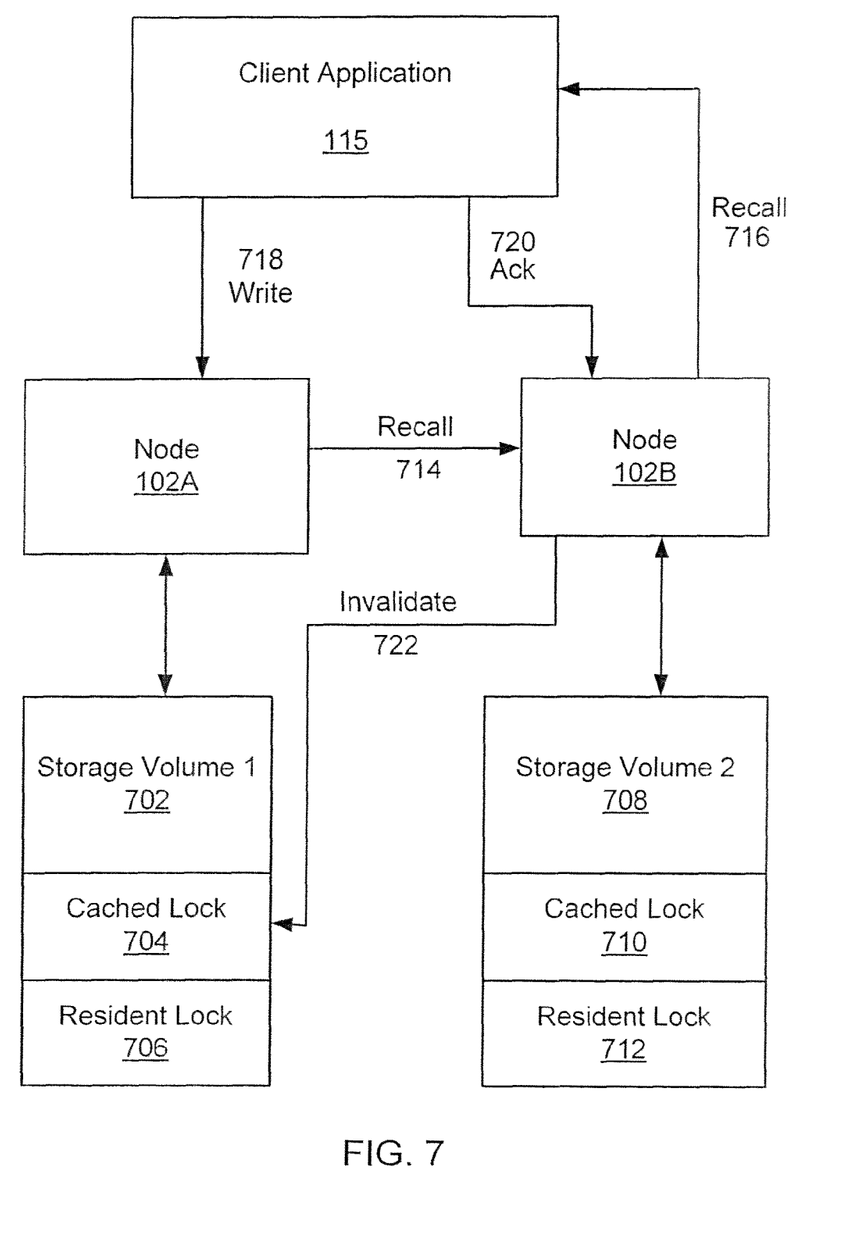
FIG. 7 shows a block diagram of a system, using the methodology of the present disclosure.

System: FIG. 7 illustrates an example of a system 700 for implementing the process steps described above with respect to FIG. 1A. As an example, system 700 shows a first node 102A that manages a first storage volume 702 and a second node 102B that interfaces with client application 115 and also manages the second storage volume 708. However, the adaptive embodiments may be implemented with more or fewer nodes, for example, both the storage volumes may be managed by a single node. Nodes 102A and 102B are similar to node 102, described above with respect to FIG. 1A.

Storage volume 1 702 may store certain cached OpLock 704 and resident OpLocks 706. Storage volume 2 708 may also store certain resident OpLocks 712 and cached OpLocks 710. A resident OpLock is "owned" by the storage volume where it resides. For example, Storage volume 2 708 owns resident locks 712.

When a cached OpLock at storage volume 1 702 needs to be recalled, an OpLock recall message 714 is sent to the entity that manages storage volume 708 (in this example, node 102B). Message 714 is similar to recall message 30 that is described above with respect to FIG. 1B. Message 714 identifies the OpLock that needs to be recalled and also includes a request for node 102B to not grant any other OpLock with respect to the affected storage volume.

Recall OpLock message (shown as 716) is then sent to client application 115. Client application 115 then performs any pending operations (for example, write operation 718) that may be affected by the OpLock recall due to message 714.

After the operation is performed, an acknowledgement 720 is sent to node 102B indicating that the OpLock recall in request 716 has been successful. The cached OpLock identified in message 714 is then invalidated (722). It is noteworthy that all cached copies of the OpLock identified in message 714 are invalidated by node 102B.

In one embodiment, where data containers from a first storage volume have to be moved to another storage volume or if the first storage volume becomes temporarily unavailable due to maintenance, failover or any other reason, then any right (for example, an OpLock) is revoked in a systematic manner such that clients are given an opportunity to complete any pending I/O operation, before revoking the right. In the SVS environment, after an OpLock is revoked, all cached copies are invalidated to prevent metadata coherency problems when the original OpLock is cleared.

While the present disclosure is described above with respect to what is currently considered its preferred embodiments, it is to be understood that the disclosure is not limited to that described above. To the contrary, the disclosure is intended to cover various modifications and equivalent arrangements within the spirit and scope of the appended claims.

What is claimed is:

1. A machine implemented method for managing a right granted by a first computing node having a processor to a client computing system, associated with an input/output (I/O) operation on a data container stored in a striped volume set (SVS) at a storage device, comprising:
  (a) determining if the right granted to the client computing system by the first computing node is to be revoked; wherein the right is cached at a first storage volume and resident at a second storage volume;
  (b) sending a recall message from the first computing node to a second computing node having a processor, for revoking the right granted to the client computing device when the second storage volume is managed by the second computing node operationally coupled to the first computing node that manages the first storage volume;
  (c) sending the recall message by the first computing node to the client computing device for revoking the right;
  (d) completing any pending I/O operation after the recall message is sent to the client computing device;
  (e) revoking the right granted to the client computing device; and
  (f) invalidating a cached copy of the right at the first storage volume by the second computing node.

2. The method of claim 1, wherein if the first storage volume and the second storage volume are managed by the first computing node then the recall message in step (b) of claim 1, is processed by the first computing node.

3. The method of claim 1, wherein the right is revoked when the data container stored at the first storage volume is to be copied from one location to another location or if the first storage volume is to be taken offline.

4. The method of claim 1, wherein the right is invalidated at a plurality of cached locations.

5. The method of claim 1, wherein the recall message to the client computing device is sent by a computing node that interfaces with the client computing device.

6. The method of claim 1, wherein the recall message from the first computing node to the second computing node includes a request for not granting any other right associated with the data container.

7. The method of claim 1, wherein the right associated with the data container is an opportunistic lock ("OpLock") embedded in a data container attribute and stored as a distributed structure.

8. A machine readable storage medium storing executable instructions, which when executed by a machine, causes the machine to perform a process for managing a right granted by a first computing node having a processor to a client computing system, associated with an input/output (I/O) operation on a data container stored in a striped volume set (SVS) at a storage device, comprising:
  (a) determining if the right granted to the client computing system by the first computing node is to be revoked; wherein the right is cached at a first storage volume and resident at a second storage volume;
  (b) sending a recall message from the first computing node to a second computing node having a processor, for revoking the right granted to the client computing device when the second storage volume is managed by the second computing node operationally coupled to the first computing node that manages the first storage volume;
  (c) sending the recall message by the first computing node to the client computing device for revoking the right;
  (d) completing any pending I/O operation after the recall message is sent to the client computing device;
  (e) revoking the right granted to the client computing device; and
  (f) invalidating a cached copy of the right at the first storage volume by the second computing node.

9. The storage medium of claim 8, wherein if the first storage volume and the second storage volume are managed by the first computing node then the recall message in step (b) of claim 8, is processed by the first computing node.

10. The storage medium of claim 8, wherein the right is revoked when the data container stored at the first storage volume is to be migrated from one location to another location or if the first storage volume is to be taken offline.

11. The storage medium of claim 8, wherein the right is invalidated at a plurality of cached locations.

12. The storage medium of 8, wherein the recall message to the client computing device is sent by a computing node that interfaces with the client computing device.

13. The storage medium of claim 8, wherein the recall message from the first computing node to the second computing node includes a request for not granting any other right associated with the data container.

14. The storage medium of claim 8, wherein the right associated with the data container is an opportunistic lock ("OpLock") embedded in a data container attribute and stored as a distributed structure.

15. A machine implemented method for managing an opportunistic lock ("OpLock") granted by a first computing node having a processor to a client computing device associated with an input/output (I/O) operation on a data container stored in a striped volume set (SVS) at a storage device, comprising:
  (a) determining if the OpLock granted to the client computing device is to be revoked; wherein the OpLock is cached at a first storage volume and resident at a second storage volume;
  (b) if the second storage volume is managed by a second computing node having a processor and operationally coupled to the first computing node that manages the first storage volume, then sending a recall message from the first computing node to the second computing node for revoking the OpLock granted to the client computing device; wherein if the first computing node manages both the first storage volume and the second storage volume, then the recall message is locally processed by the first computing node;
  (c) sending the recall message by the first computing node to the client computing device for revoking the OpLock;
  (d) completing any pending I/O operation after the recall message is sent to the client computing device;
  (e) revoking the OpLock granted to the client computing device; and
  (f) invalidating a cached copy of the OpLock at the first storage volume.

16. The method of claim 15, wherein the OpLock is revoked when the data container stored at the first storage volume is to be copied from one location to another location or if the first storage volume is to be taken offline.

17. The method of claim 15, wherein the recall message to the client computing device is sent by a computing node that interfaces with the client computing device.

18. The method of claim 15, wherein the recall message from the first computing node to the second computing node includes a request for not granting any other OpLock associated with the data container.

19. A machine readable storage medium storing executable instructions, which when executed by a machine, causes the machine to perform a process for managing an opportunistic lock ("OpLock") granted by a first computing node having a processor to a client computing device associated with an input/output (I/O) operation on a data container stored in a striped volume set (SVS) at a storage device, comprising:
  (a) determining if the OpLock granted to the client computing device is to be revoked; wherein the OpLock is cached at a first storage volume and resident at a second storage volume;
  (b) if the second storage volume is managed by a second computing node having a processor and operationally coupled to the first computing node that manages the first storage volume, then sending a recall message from the first computing node to the second computing node for revoking the OpLock granted to the client computing device; wherein if the first computing node manages both the first storage volume and the second storage volume, then the recall message is locally processed by the first computing node;
  (c) sending the recall message by the first computing node to the client computing device for revoking the OpLock;
  (d) completing any pending I/O operation after the recall message is sent to the client computing device;
  (e) revoking the OpLock granted to the client computing device; and (f) invalidating a cached copy of the OpLock at the first storage volume.

20. The storage of claim 19, wherein the OpLock is revoked when the data container stored at the first storage volume is to be copied from one location to another location or if the first storage volume is to be taken offline.

21. The storage medium of claim 19, wherein the recall message to the client computing device is sent by a computing node that interfaces with the client computing device.

22. A computer program product, comprising:
a computer usable storage medium having computer readable instructions embodied therein for managing a right granted by a first computing node having a processor to a client computing system, associated with an input/output (I/O) operation on a data container stored in a striped volume set (SVS) at a storage device, comprising:
(a) determining if the right granted to the client computing system by the first computing node is to be revoked; wherein the right is cached at a first storage volume and resident at a second storage volume;
(b) sending a recall message from the first computing node to a second computing node having a processor, for revoking the right granted to the client computing device when the second storage volume is managed by the second computing node operationally coupled to the first computing node that manages the first storage volume;
(c) sending the recall message by the first computing node to the client computing device for revoking the right;
(d) completing any pending I/O operation after the recall message is sent to the client computing device;
(e) revoking the right granted to the client computing device; and
(f) invalidating a cached copy of the right at the first storage volume by the second computing node.

23. The computer program product of claim 22, wherein if the first storage volume and the second storage volume are managed by the first computing node then the recall message in step (b) of claim 22, is processed by the first computing node.

24. The computer program product of claim 22, wherein the right is revoked when the data container stored at the first storage volume is to be copied from one location to another location or if the first storage volume is to be taken offline.

25. The computer program product of claim 22, wherein the right is invalidated at a plurality of cached locations.

26. The computer program product of claim 22, wherein the recall message to the client computing device is sent by a computing node that interfaces with the client computing device.

27. The computer program product of claim 22, wherein the recall message from the first computing node to the second computing node includes a request for not granting any other right associated with the data container.

28. The computer program product of claim 22, wherein the right associated with the data container is an opportunistic lock ("OpLock") embedded in a data container attribute and stored as a distributed structure.

29. A machine implemented method for revoking a right granted by a first computing node having a processor to a client computing device associated with an input/output (I/O) operation on a data container stored in a striped volume set (SVS) at a storage device, comprising:
(a) receiving a recall message at a second computing node from the first computing node for revoking the right cached at a first storage volume and resident at a second storage volume; wherein the first computing node manages the first storage volume storing striped data and the second computing node manages the second storage volume;
(b) forwarding the recall message by the first computing node to the client computing device that completes any pending I/O operation after receiving the recall message; and
(c) revoking the right granted to the client computing device and invalidating the cached copy of the right at the first storage volume.

30. The method of claim 29, wherein if both the first storage volume and the second storage volume are managed by the first computing node then the recall message is processed locally by the first computing node.

31. The method of claim 29, wherein the right is revoked when the data container stored at the first storage volume is to be copied from one location to another location or if the first storage volume is to be taken offline.

32. The method of claim 29, wherein the right associated with the data container is an opportunistic lock ("OpLock").

* * * * *